(12) United States Patent
Maruyama et al.

(10) Patent No.: US 7,767,721 B2
(45) Date of Patent: Aug. 3, 2010

(54) COPPER OXIDE ULTRAFINE PARTICLES

(75) Inventors: Mutsuhiro Maruyama, Fuji (JP); En-Hai Sun, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 1090 days.

(21) Appl. No.: 10/537,097

(22) PCT Filed: Dec. 2, 2003

(86) PCT No.: PCT/JP03/15435
§ 371 (c)(1), (2), (4) Date: Jun. 2, 2005

(87) PCT Pub. No.: WO2004/050559
PCT Pub. Date: Jun. 17, 2004

(65) Prior Publication Data
US 2006/0098065 A1   May 11, 2006

(30) Foreign Application Priority Data

Dec. 3, 2002  (JP) .............................. 2002-350998
Jul. 9, 2003  (JP) .............................. 2003-272467

(51) Int. Cl.
  B01F 3/12   (2006.01)
  C01G 3/02   (2006.01)
  G01D 11/00  (2006.01)
(52) U.S. Cl. .................... 516/88; 252/503; 252/506; 252/510; 106/31.65; 106/31.9; 977/773; 977/811
(58) Field of Classification Search .................. 516/88; 252/503, 506, 510; 977/773, 811; 106/31.65, 106/31.9
See application file for complete search history.

(56) References Cited

U.S. PATENT DOCUMENTS

2005/0069648 A1 * 3/2005 Maruyama ............... 106/286.1
2006/0098065 A1 * 5/2006 Maruyama et al. .......... 347/100

FOREIGN PATENT DOCUMENTS

EP  0 355 885 A2   2/1990
JP  2-145422 A     6/1990
JP  7-232919 A     9/1995
JP  11-349328 A    12/1999
JP  2002-362909 A  12/2002

OTHER PUBLICATIONS

Curtis et al., "A Morphology-Selective Copper Organosol", Angewandte Chemie, International Edition in English, 27, Issue 11, (Nov. 1988), pp. 1530-1533.*
http://en.wikipedia.org/wiki/Cooper%28II%29 acetate (Mar. 5, 2008).
Zou et al., Chinese Science Bulletin, 1994, vol. 39, No. 1, pp. 14-18.
Rockenberger et al., Journal of American Chemical Society, 1999, vol. 121, pp. 11595-11596.
Feldmann et al., Angewandte Chemie International edition, 2001, vol. 40, No. 2, pp. 359-362.
Dong et al., Journal of Colloid and Interface Science, 2001, vol. 243, pp. 85-89.
Straumanis et al., Zeitschrift fur anorganische and allgemeine Chemie, 1935, vol. 224, pp. 107-112, see instant spec. for English lang. description.

* cited by examiner

*Primary Examiner*—Daniel S Metzmaier
(74) *Attorney, Agent, or Firm*—Birch, Stewart, Kolasch & Birch, LLP

(57) ABSTRACT

A soft agglomerate of copper oxide ultrafine particles which has an average primary particle diameter of not more than 100 nm and an average secondary particle diameter of not less than 0.2 μm and of producing the soft agglomerate by (1) forming ultrafine copper oxide by reducing a cuprous carboxyl compound in an aqueous solution, with hydrazine and/or a hydrazine derivative, optionally with a base and optionally with organic compounds, such as alcohol (e.g., ethylene glycol or ethanol), ether, ester or amide; and simultaneously or separately applying an agglomerating force, e.g., agglomerating agent; to produce copper oxide soft agglomerate. Alternatively (2), forming a colloidal dispersion of cuprous oxide ultrafine particles by heating and reducing at least one copper compound (e.g., copper carboxyl, copper alkoxy and copper diketonate compound) at a temperature of not lower than 160° C. and forming a soft agglomerate by either further heating the colloidal dispersion or by adding an agglomerating agent, e.g., monoalcohol, ether, ester, nitrite, amide and imide. Colloidal dispersions are formed by separating and redispersing the soft agglomerate. Cuprous oxide ultrafine particles are used as fillers, such as electroconductive paste and electroconductive ink, and manufacture of copper-oxide ultrafine particle colloid dispersion liquid used as inkjet ink.

14 Claims, No Drawings

COPPER OXIDE ULTRAFINE PARTICLES

TECHNICAL FIELD

The present invention relates to copper oxide ultrafine particles and a method for producing the same. Furthermore, the present invention relates to a colloidal dispersion in which copper oxide ultrafine particles are dispersed in the form of a colloid, and a method for producing the same. The copper oxide ultrafine particles obtained in the present invention can be used as fillers for electrically conductive pastes, electrically conductive inks and the like in the field of production of printing boards. Moreover, since the colloidal dispersion of the copper oxide ultrafine particles, which is obtained in the present invention, is a liquid of low viscosity, it can be coated on a substrate by ink jet methods and can be used as an ink jet ink.

BACKGROUND ART

For the production of copper oxide ultrafine particles having a primary particle diameter of less than 100 nm, there has usually been employed a method of protecting the surface of ultrafine particles with a surfactant or a specific three-dimensionally bulky organic compound in order to inhibit excessive increase in the diameter of particles produced by the reaction. In general, according to such production method, the copper oxide ultrafine particles are obtained in the suspended state in the form of a colloid in the reaction solution, and hence a high-speed centrifuging step is necessary for separating the particles as a solid matter from the reaction solution to remove impurities or the like.

Although an explanation will be made based on particular cuprous oxide ultrafine particles, the present invention is however not limited to cuprous oxide ultrafine particles, but can also be similarly applied to other copper oxides.

For example, "Chinese Science Bulletin" (1994, 39, 14-18) discloses that cuprous oxide ultrafine particles having a primary particle diameter of 5-10 nm, the surface of which is covered with dodecylbenzenesulfonic acid, are obtained by dispersing in toluene an aqueous copper acetate solution together with dodecylbenzenesulfonic acid as a surfactant and then reducing the copper acetate (method 1). This method is called the micro-emulsion method which comprises producing microfine water drops having a diameter of several nanometers to several tens of nanometers in an oil layer of toluene and reducing the copper acetate present in the microfine water drops to obtain cuprous oxide. The size of the resulting cuprous oxide particles is of about microfine droplets, and the surface of the fine particles is covered with a surfactant to stabilize the particles.

The cuprous oxide ultrafine particles obtained by this method are in the state of floating in the form of a colloid in water or in the oil layer, and a centrifuging step is necessary for removing impurities in the liquid and separating the ultrafine particles as a solid matter from the solution. However, it is not easy to separate ultrafine particles of less than 100 nm in diameter by centrifugation, and it is generally necessary to use an ultracentrifuge which requires operations to reduce air resistance by keeping a rotating atmosphere or of rotor under reduced pressure. Therefore, productivity is lowered and thus the method cannot be employed for industrial uses requiring mass-production.

On the other hand, "Journal of American Chemical Society" (1999, 121, 11595-11596) discloses that a precipitate of cuprous oxide ultrafine particles having an average primary particle diameter of about 7 nm and covered with a surfactant of one or both of octylamine and hexadecylamine is obtained by pouring an octylamine solution containing a specific organic copper compound into hexadecylamine heated to 250° C. and stopping the heating when the temperature reaches 230° C., followed by cooling (method 2). It is supposed that in this method, amino groups having a strong coordination ability coordinate to the surface of the cuprous oxide particles at the beginning of formation of the particles to inhibit increase of particle diameter of the cuprous oxide.

This method has the feature that the cuprous oxide ultrafine particles are obtained not in the colloidal state in the reaction solution, but in the state of a precipitate, and it requires no centrifugation and hence has the advantage that the particles can be easily recovered. Furthermore, the precipitate per se is a soft agglomerate comprising weakly agglomerated cuprous oxide ultrafine particles whose surface is covered with an amino group-containing organic material, and a colloidal solution of cuprous oxide ultrafine particles can be obtained by redispersing the agglomerate in a suitable dispersion medium such as toluene. However, because these cuprous oxide ultrafine particles have an insulating organic compound of large molecular weight on their surface, they have a problem of being inferior in electric conductivity when they are used as an electrically conductive filler.

On the other hand, there has been known a method for producing cuprous oxide ultrafine particles which do not have a special surfactant or a bulky organic compound on the surface.

"Angewandte Chemie International edition" (2001, No. 40, Vol. 2, p359) discloses that cuprous oxide ultrafine particles having a particle size distribution of 30-200 nm are obtained by dissolving acetylacetonatocopper complex in a polyhydric alcohol and adding thereto a small amount of water, followed by heating to 190° C. (method 3). The cuprous oxide ultrafine particles obtained by this method tend to be larger in particle diameter as compared with those which have a surfactant or a bulky organic compound. Moreover, because the resulting particles have a high monodispersibility and are obtained as a colloidal dispersion, it is necessary to carry out centrifugation in order to remove by-products and separate cuprous oxide ultrafine particles as a solid matter. As such, since the centrifugation operations require labor and time as mentioned above, there has been a problem that the method can hardly be applied to industrial uses which require mass-production.

"Journal of Colloid and Interface Science" (243, 85-89, 2001) discloses a method for producing cuprous oxide ultrafine particles by adding hydrazine to an aqueous alkaline solution of copper sulfate to which a small amount of a polyhydric alcohol is added as an additive (method 4). The cuprous oxide ultrafine particles obtained by this method are preferred because they have a small primary particle diameter of 9-30 nm. And, they further have an advantage that a precipitate of 200 nm-1 μm in secondary particle diameter is produced, and hence the particles can be easily separated from the reaction solution. However, the precipitate obtained is a hard agglomerate comprising secondary particles formed by strong agglomeration of the primary particles, and this precipitate is difficult to redisperse in a dispersion medium. Therefore, a colloidal solution in which the cuprous oxide ultrafine particles are in the colloidal state in the dispersion medium cannot be prepared using the resulting particles.

On the other hand, "Zeitschrift fur anorganische und allgemeine Chemie" (Bd. 224, 107-112 (1935)) discloses that a precipitate of cuprous oxide particles is obtained by adding a 20% aqueous hydrazine solution to a concentrated aqueous copper acetate solution (method 5). However, this literature is silent on amounts of copper acetate and hydrazine as starting materials and only describes that when hydrazine is added in an excessive amount, copper acetate is reduced to metallic copper, and furthermore it does not describe particle diameter of the resulting cuprous oxide.

Summarizing the above methods for producing cuprous oxide ultrafine particles, the cuprous oxide fine particles are obtained (1) in the state of being dispersed in the form of a colloid in the reaction solution (the method 1 and the method 3) and (2) as an agglomerated precipitate (the method 2 and the method 4), and the case (2) is superior from the viewpoint of handleability of the particles. However, a precipitate of the cuprous oxide ultrafine particles obtained by the method 4 have the disadvantage that the precipitate is a hard agglomerate which cannot be redispersed and can hardly be redispersed in a dispersion medium. On the other hand, a precipitate of the cuprous oxide ultrafine particles obtained by the method 2 have the advantage that a colloidal dispersion having the desired composition can be easily prepared by redispersing them in a dispersion medium, but have the problems that the particles have an insulating surfactant on the surface and the actual state of the resulting particles is a composite of cuprous oxide and surfactant, which is difficult to use, for example, as electrically conductive fillers or the like for obtaining copper films by firing.

An object of the present invention is to provide a soft agglomerate of copper oxide ultrafine particles which comprises copper oxide ultrafine particles having an average primary particle diameter of not more than 100 nm and can be redispersed in a dispersion medium and a method for producing the same. Another object is to provide a method for producing a colloidal dispersion in which copper oxide ultrafine particles are dispersed.

DISCLOSURE OF INVENTION

As a result of intensive research conducted by the inventors on copper oxide ultrafine particles under the above circumstances, the present invention has been accomplished. The present invention has the following constituents.

(1) A soft agglomerate of copper oxide ultrafine particles having an average primary particle diameter of not more than 100 nm and an average secondary particle diameter of not less than 0.2 µm.

(2) A soft agglomerate of copper oxide ultrafine particles described in (1) having an average primary particle diameter of not more than 25 nm.

(3) A soft agglomerate of copper oxide ultrafine particles described in (1) having an average primary particle diameter of not more than 10 nm.

(4) A soft agglomerate of copper oxide ultrafine particles described in any one of (1)-(3) which does not have a surfactant or a bulky organic compound on the particle surface.

(5) A method for producing a soft agglomerate of copper oxide ultrafine particles described in any one of (1)-(4) which comprises producing copper oxide ultrafine particles and simultaneously therewith forming a soft agglomerate of the particles by producing copper oxide ultrafine particles in a bad dispersion medium.

(6) A method for producing a soft agglomerate of copper oxide ultrafine particles described in any one of (1)-(4) which comprises producing copper oxide ultrafine particles in a good dispersion medium and then forming a soft agglomerate of the copper oxide ultrafine particles by applying an agglomerating force between the copper oxide ultrafine particles.

(7) A method for producing a soft agglomerate of copper oxide ultrafine particles described in any one of (1)-(4) which comprises producing copper oxide ultrafine particles in a good dispersion medium and simultaneously therewith forming a soft agglomerate of the copper oxide ultrafine particles by applying an agglomerating force between the copper oxide ultrafine particles.

(8) A method for producing a dispersion of copper oxide ultrafine particles which comprises a first step of preparing copper oxide ultrafine particles having an average primary particle diameter of not more than 100 nm in a first solvent and simultaneously therewith obtaining a soft agglomerate of copper oxide ultrafine particles having a secondary particle diameter of not less than 0.2 µm, a second step of separating the soft agglomerate obtained at the first step from the first solvent, and a third step of redispersing the soft agglomerate separated at the second step in a second solvent to obtain a dispersion of copper oxide ultrafine particles.

(9) A method for producing a dispersion of copper oxide ultrafine particles described in (8), wherein the dispersion of copper oxide ultrafine particles obtained at the third step are in the colloidal state and the copper oxide ultrafine particles are suspended in the dispersion.

(10) A method for producing a dispersion of copper oxide ultrafine particles described in (9), wherein the copper oxide ultrafine particles have an average secondary particle diameter of less than 200 nm in the dispersion of copper oxide ultrafine particles which is in the colloidal state.

(11) A method for producing a dispersion of copper oxide ultrafine particles described in any one of (8)-(10), wherein the second solvent contains a dispersion agent for the copper oxide ultrafine particles.

(12) A method for producing a dispersion of copper oxide ultrafine particles described in (11), wherein the dispersion agent is a polyhydric alcohol.

(13) A method for producing a dispersion of copper oxide ultrafine particles described in (12), wherein the polyhydric alcohol has a carbon number of not more than 10.

(14) A dispersion of copper oxide ultrafine particles which is obtained by the method of any one of (8)-(13).

(15) A dispersion of cuprous oxide ultrafine particles described in (14) which contains 0.01-50% by weight of a reducing agent capable of reducing the copper oxide ultrafine particles in the dispersion.

(16) Copper oxide ultrafine particles which have an average primary particle diameter of not more than 100 nm and an average secondary particle diameter of less than 0.2 µm.

(17) Copper oxide ultrafine particles described in (15) having an average primary particle diameter of not more than 25 nm.

(18) Copper oxide ultrafine particles described in (15) having an average primary particle diameter of not more than 10 nm.

(19) Copper oxide ultrafine particles described in any one of (16)-(18) which do not have a surfactant or a bulky organic compound on the surface of the particles.

(20) A method for producing copper oxide ultrafine particles described in any one of (16)-(19) which comprises obtaining copper oxide ultrafine particles by dispersing the soft agglomerate of copper oxide ultrafine particles of any one of (1)-(4).

(21) A colloidal dispersion of copper oxide ultrafine particles which contains copper oxide ultrafine particles of any one of (16)-(19), the particles being suspended in the dispersion medium.

(22) A colloidal dispersion of copper oxide ultrafine particles described in (21), wherein the total weight of the copper oxide ultrafine particles is not less than 10% by weight based on the total weight of the dispersion.

(23) A soft agglomerate of copper oxide ultrafine particles described in any one of (1)-(4), wherein the copper oxide is cuprous oxide.

(24) A method for producing a soft agglomerate of copper oxide ultrafine particles described in any one of (5)-(7), wherein the copper oxide is cuprous oxide.

(25) A method for producing a dispersion of copper oxide ultrafine particles described in any one of (8)-(13), wherein the copper oxide is cuprous oxide.

(26) A dispersion of copper oxide ultrafine particles described in (14) or (15), wherein the copper oxide is cuprous oxide.

(27) Copper oxide ultrafine particles described in any one of (16)-(19), wherein the copper oxide is cuprous oxide.

(28) A method for producing copper oxide ultrafine particles described in (20), wherein the copper oxide is cuprous oxide.

(29) A colloidal dispersion of copper oxide ultrafine particles described in (21) or (22), wherein the copper oxide is cuprous oxide.

(30) A method for producing a soft agglomerate of cuprous oxide ultrafine particles described in (23) which comprises reducing a copper carboxyl compound with hydrazine and/or a hydrazine derivative in an amount of 0.4-5.0 moles based on 1 mole of the copper carboxyl compound in an aqueous solution containing not less than 10% by weight of water to produce cuprous oxide ultrafine particles.

(31) A method for producing a soft agglomerate of cuprous oxide ultrafine particles described in (30), wherein the solution contains at least one organic compound selected from the group consisting of alcohol compounds, ether compounds, ester compounds and amide compounds.

(32) A method for producing a soft agglomerate of cuprous oxide ultrafine particles described in (30) or (31) which further comprises adding a basic compound for reducing the copper carboxyl compound with hydrazine and/or a hydrazine derivative.

(33) A method for producing a soft agglomerate of cuprous oxide ultrafine particles described in any one of (30)-(32), wherein the copper carboxyl compound is copper acetate.

(34) A method for producing a soft agglomerate of cuprous oxide ultrafine particles described in any one of (30)-(33), wherein hydrazine and/or a hydrazine derivative are dissolved in the solution at a concentration higher than 20% by weight and the solution is added to the reaction solution.

(35) A method for producing a soft agglomerate of cuprous oxide ultrafine particles described in (23) which comprises obtaining a colloidal dispersion of cuprous oxide ultrafine particles by heating and reducing at least one copper compound selected from the group consisting of a copper carboxyl compound, a copper alkoxy compound and copper diketonate compound at a temperature of not lower than 160° C. in diethylene glycol and forming a soft agglomerate of cuprous oxide ultrafine particles by further heating the colloidal dispersion.

(36) A method for producing a soft agglomerate of cuprous oxide ultrafine particles described in (23) which comprises obtaining a colloidal dispersion of cuprous oxide ultrafine particles by heating and reducing at least one copper compound selected from the group consisting of a copper carboxyl compound, a copper alkoxy compound and copper diketonate compound at a temperature of not lower than 160° C. in diethylene glycol and then adding an agglomerating agent for cuprous oxide ultrafine particles to the dispersion.

(37) A method for producing a soft agglomerate of cuprous oxide ultrafine particles described in (23) which comprises heating and reducing at least one copper compound selected from the group consisting of a copper carboxyl compound, a copper alkoxy compound and copper diketonate compound at a temperature of not lower than 160° C. in diethylene glycol and simultaneously adding to the diethylene glycol an agglomerating agent for cuprous oxide ultrafine particles, which is soluble in diethylene glycol at the reaction temperature.

(38) A method for producing a soft agglomerate of cuprous oxide ultrafine particles described in (36) or (37), wherein the agglomerating agent is at least one compound selected from the group consisting of monoalcohol compounds, ether compounds, ester compounds, nitrite compounds, amide compounds and imide compounds.

(39) A method for producing a soft agglomerate of cuprous oxide ultrafine particles described in any one of (35)-(37), wherein diethylene glycol contains water in an amount of not more than 30 moles based on 1 mole of the copper compound.

The soft agglomerate of copper oxide ultrafine particles of the present invention is characterized by having an average primary particle diameter of not more than 100 nm and an average secondary particle diameter of not less than 0.2 μm. Since the soft agglomerate of copper oxide ultrafine particles of the present invention is large in secondary particle diameter, it has the characteristics that it is excellent in handleability as solid matter and, on the other hand, it readily disperses in a dispersion medium and thus a dispersion in which the ultrafine particles are uniformly dispersed can be produced.

In general, the agglomeration form of ultrafine particles includes two kinds of a soft agglomerate where the fine particles are attracted to each other by such a weak force that the fine particles can be redispersed and a hard agglomerate where the fine particles are bonded to each other by such a strong bonding that the fine particles cannot be redispersed. The soft agglomerate means an agglomerate where the fine particles constituting the agglomerate can be cleaved and dispersed by a physical or chemical means. The physical means here is a method of applying a physical energy to the agglomerate by ultrasonic, beads mill, high-speed jet mill, screw agitation, planetary mixer, three-roll, etc. The chemical means is a method of applying a chemical energy to the agglomerate by adjusting the pH of the dispersion, by adding acid or base to the dispersion, and the like. The soft agglomerate may be dispersed by cleaving and dispersing the agglomerate by applying an energy larger than the attraction force between the respective fine particles constituting the agglomerate. On the other hand, in the case of the hard agglomerate, it is difficult to cleave and disperse the fine particles constituting the hard agglomerate by physical or chemical means.

Next, the secondary particle diameter is a particle diameter of ultrafine particles which are in agglomeration state, and the average particle diameter can be estimated by laser scattering method or alternatively the average value can be estimated by placing the particles on a slide glass and actually observing them with a common microscope. Ultrafine particles which have a tendency to readily form a soft agglomerate sometimes further form a weak bond between the resulting soft agglomerates to form a higher order structural body. When a higher order structural body is formed, the size of the whole higher structural body is taken as the secondary particle diameter. Such higher order structural body tends to increase in particle diameter and hence it is preferred to actually observe the body with a microscope.

The primary particle diameter is a particle diameter of individual copper oxide ultrafine particles constituting the secondary particles which are agglomerates, namely, diameter of individual fine particles. Since the copper oxide ultrafine particles of the present invention are extremely small in primary particle diameter, the size can be estimated by observing the shape with an electron microscope.

The degree of dispersibility of the agglomerate can be estimated by the change of secondary particle diameter before and after subjecting it to dispersion treatment. In the present invention, the soft agglomerate of copper oxide ultrafine particles preferably has such a dispersibility that the average secondary particle diameter (R2) after dispersion treatment and the average secondary particle diameter (R1) of the soft agglomerate before dispersion treatment satisfy the relation R1/R2>5.

The smaller average primary particle diameter of the copper oxide ultrafine particles tends to give better redispersibility into a dispersion medium in the present invention, and the average primary particle diameter is preferably not more than 25 nm, more preferably not more than 10 nm. If the average primary particle diameter exceeds 100 nm, redispersibility in a dispersion medium tends to deteriorate, which is not preferred.

The average secondary particle diameter of the soft agglomerate of copper oxide ultrafine particles in the present invention is not less than 0.2 µm, more preferably not less than 1 µm, further preferably not less than 10 µm. If the average secondary particle diameter is less than 0.2 µm, the handleability of the particles tends to deteriorate, which is not preferred.

It is preferred that the copper oxide ultrafine particles of the present invention do not have a surfactant or a bulky organic compound on the surface. The surfactant or bulky organic compound on the surface is not preferred because it acts as an insulating component when the particles are used as electrically conductive fillers.

The surfactant here means an amphiphatic material having hydrophilic group and lipophilic group in the molecule, and includes a cationic surfactant, an anionic surfactant, a non-polar surfactant, and the like. Here, compounds which are non-amphiphatic, such as low-molecular alcohol compounds, and show surface activity upon being coordinated and adsorbed to the surface of particles are excluded from the above surfactants. The molecular weight and the like of the surfactants are not particularly limited, and mention may be made of, for example, compounds having a hydrophilic group such as sulfate salt, ammonium salt or polyethylene glycol at the end of an alkyl group having a chain length long enough to develop lipophilicity.

The bulky organic compounds here are organic compounds which are non-amphiphatic and have a large carbon number, such as dodecylbenzene, tridecane and hexadecane.

These surfactants and bulky organic compounds mean organic compounds usually having 8 or more carbon atoms.

The soft agglomerate of copper oxide ultrafine particles of the present invention may contain by-products such as metallic copper in an amount of at most 5% by weight so long as the by products do not damage the characteristics such as (1) stability of the soft agglomerate particles, (2) redispersibility of the soft agglomerate in a dispersion medium, (3) stability of the dispersion of redispersed copper oxide ultrafine particles, and (4) electric conductivity or stability of copper films obtained by firing when the soft agglomerate is used as an electrically conductive ink or a filler.

Next, the method for producing the soft agglomerate of copper oxide ultrafine particles will be explained. The method for producing the soft agglomerate of copper oxide ultrafine particles of the present invention includes the following (I)-(III).

(I) A method for producing a soft agglomerate of copper oxide ultrafine particles which comprises simultaneously carrying out production of copper oxide ultrafine particles and formation of a soft agglomerate of the particles by producing the copper oxide ultrafine particles in a bad dispersion medium.

(II) A method for producing a soft agglomerate of copper oxide ultrafine particles which comprises producing copper oxide ultrafine particles in a good dispersion medium and thereafter forming a soft agglomerate of the copper oxide ultrafine particles by giving an agglomeration force between the copper oxide ultrafine particles.

(III) A method for producing a soft agglomerate of copper oxide ultrafine particles which comprises producing copper oxide ultrafine particles in a good dispersion medium and simultaneously therewith forming a soft agglomerate of the copper oxide ultrafine particles by giving an agglomeration force between the copper oxide ultrafine particles.

In the above explanation, the bad dispersion medium and good dispersion medium for copper oxide ultrafine particles mean a dispersion medium in which dispersibility of the copper oxide ultrafine particles is low and a dispersion medium in which dispersibility of the copper oxide ultrafine particles is high, respectively. As the good dispersion media, mention may be made of polyhydric alcohols having two or more hydroxyl groups in the molecule. Of the polyhydric alcohols, especially preferable good dispersion medium is diethylene glycol. The bad dispersion media include water and the like.

Next, the agglomeration force given between the copper oxide ultrafine particles means application of chemical or physical energy which brings about agglomeration, and includes, for example, a method of increasing impingement frequency between the ultrafine particles by heating to cause easy agglomeration, a method of lowering electrostatic repulsion force between the copper oxide ultrafine particles by adding an ionic compound to bring about easy agglomeration, a method of adding a bad dispersion medium, etc.

Specific methods for producing particularly a soft agglomerate of cuprous oxide ultrafine particles will be explained below. As the specific methods for producing a soft agglomerate of cuprous oxide ultrafine particles, the following methods (i)-(iv) may be mentioned.

(i) A method for producing a soft agglomerate of cuprous oxide ultrafine particles which comprises reducing a copper carboxyl compound with hydrazine and/or a hydrazine derivative in an amount of 0.4-5.0 moles based on 1 mole of the copper carboxyl compound in an aqueous solution containing not less than 10% by weight of water to produce cuprous oxide ultrafine particles.

(ii) A method for producing a soft agglomerate of cuprous oxide ultrafine particles which comprises heating and reducing at least one copper compound selected from the group consisting of a copper carboxyl compound, a copper alkoxy compound and a copper diketonate compound at a temperature of not lower than 160° C. in diethylene glycol to obtain a colloidal dispersion of cuprous oxide ultrafine particles and further heating the resulting colloidal dispersion to softly agglomerate the cuprous oxide ultrafine particles.

(iii) A method for producing a soft agglomerate of cuprous oxide ultrafine particles which includes heating and reducing at least one copper compound selected from the group consisting of a copper carboxyl compound, a copper alkoxy compound and copper diketonate compound at a temperature of not lower than 160° C. in diethylene glycol to obtain a colloidal dispersion of cuprous oxide ultrafine particles and thereafter adding an agglomerating agent for cuprous oxide ultrafine particles to the resulting colloidal dispersion.

(iv) A method for producing a soft agglomerate of cuprous oxide ultrafine particles which comprises heating and reducing at least one copper compound selected from the group consisting of a copper carboxyl compound, a copper alkoxy compound and copper diketonate compound at a temperature of not lower than 160° C. in diethylene glycol and simultaneously adding to the diethylene glycol an agglomerating agent for cuprous oxide ultrafine particles which is soluble in a polyhydric alcohol at the reaction temperature.

The production method (i) comprises reducing a copper carboxyl compound with hydrazine and/or a hydrazine derivative in an amount of 0.4-5.0 moles based on 1 mole of the copper carboxyl compound in an aqueous solution containing not less than 10% by weight of water to produce cuprous oxide ultrafine particles. The copper starting material used in this method is a copper carboxyl compound. The copper carboxyl compound is not limited in its chemical composition so long as it dissolves in an aqueous solution containing not less than 10% by weight of water. For example, there may be used commercially available copper carboxyl compounds such as copper acetate, copper carboxyl compounds obtained by reacting a copper salt with a carboxyl group-containing compound, and the like. Of the copper carboxyl compounds, the most preferred is copper acetate.

As examples of the copper salt used in the reaction of the copper salt and the carboxyl group-containing compound, mention may be made of copper hydroxide, copper nitrate, copper carbonate, and the like. The carboxyl group-containing compound includes a compound containing carboxylic acid or a salt thereof in the molecule, and mention may be made of, for example, saturated carboxylic acids, unsaturated carboxylic acids and salts thereof. Examples thereof are formic acid, acetic acid, propionic acid, butylacetic acid, etc.

The reaction of the copper salt with the carboxyl group-containing compound may be carried out just before conversion to cuprous oxide with addition of hydrazine and/or a hydrazine derivative in the same reaction vessel or may be previously carried out in a separate reaction vessel. There may be used only one or two or more of the copper carboxyl compounds.

According to this method, into a solution which contains not less than 10% by weight of water and in which a copper carboxyl compound is dissolved are introduced hydrazine and/or a hydrazine derivative in an amount of 0.4-5.0 moles per 1 mole of the copper carboxyl compound, thereby to reduce the copper carboxyl compound, whereby cuprous oxide ultrafine particles of not more than 100 nm in average primary particle diameter are obtained.

The hydrazine derivatives include alkyl hydrazines such as monomethylhydrazine, dimethylhydrazine and β-hydroxyethylhydrazine, and hydrazine salts such as hydrazine sulfate, neutral hydrazine sulfate and hydrazine carbonate. Theses are compounds which are other than hydrazine and have nitrogen-nitrogen bond in structure and have reducibility. Among hydrazine and hydrazine derivatives, hydrazine is preferred. As hydrazine, both anhydrous hydrazine and hydrated hydrazine can be used, and hydrated hydrazine is preferred from the point of safety.

When the hydrazine and/or hydrazine derivatives are liquid, they may be introduced into a reaction vessel as they are or after they are diluted. When the hydrazine and/or hydrazine derivatives are solid, it is preferred to dissolve them in a reaction solvent and introduce the solution into the reaction vessel. In case the hydrazine and/or hydrazine derivatives are diluted or dissolved, the resulting cuprous oxide ultrafine particles tend to have a large primary particle diameter if the concentration of the hydrazine and/or hydrazine derivatives is low. The concentration is preferably higher than 20% by weight, more preferably 60% by weight or higher.

In order to adjust the reducing power of hydrazine, a basic material may be added to the reaction solution or aqueous hydrazine solution as far as it does not affect the reaction product. By the addition of the basic material, the particle diameter of the resulting cuprous oxide particles sometimes decreases, which is preferred for obtaining cuprous oxide of small particle diameter. As the basic compound, inorganic basic compounds such as sodium hydroxide and potassium hydroxide are particularly preferred.

The amount of the hydrazine and/or hydrazine derivative added in the present invention is 0.4-5.0 moles, preferably 0.9-2.0 moles based on 1 mole of the copper carboxyl compound. If the molar ratio of the hydrazine and/or hydrazine derivative and the copper carboxyl compound is less than 0.4, the reduction reaction is slow and the average primary particle diameter of the cuprous oxide exceeds 100 nm. If the molar ratio of the hydrazine and/or hydrazine derivative and the copper carboxyl compound exceeds 5.0, the product is not limited to cuprous oxide and copper particles are also produced in an amount of 50% by weight or more.

The reaction medium used in the method (i) is water alone or a mixed aqueous solution containing 90% by weight or less of an organic compound other than water. The preferred range of the amount of water in the mixed aqueous solution is not less than 20% by weight and less than 80% by weight. It is preferred to use a mixed aqueous solution containing an organic compound other than water as the reaction medium because the average primary particle diameter of the resulting cuprous oxide ultrafine particles becomes smaller.

The organic compound used in the reaction medium in the method (i) is not limited as far as it homogeneously mixes with water and does not react with the hydrazine and/or hydrazine derivative which are reducing agents. There may be used alcohol compounds, ether compounds, ester compounds, amide compounds, etc. From the point of handleability, organic compounds which are liquid at room temperature are preferred, and among them, alcohol compounds are preferred, and examples thereof are methanol, ethanol, propanol, butanol, ethylene glycol, diethylene glycol, triethylene glycol, polyethylene glycol, glycerin, 1,2-propanediol, 1,3-propanediol, 1,2-butanediol, 1,3-butanediol, 1,4-butanediol, 2,3-butanediol, pentanediol, hexanediol, octanediol, etc.

The preferred concentration of the copper carboxyl compound in the reaction solution is preferably not less than 0.01% by weight and not more than 50% by weight, more preferably not less than 3% by weight and not more than 20% by weight based on the total weight of the reaction solution and the copper carboxyl compound.

Although the copper carboxyl compound must be substantially dissolved in the reaction solution, there is substantially no problem obtaining the cuprous oxide ultrafine particles even when the compound is partially undissolved in the reaction solvent. If the concentration of the copper carboxyl compound is less than 0.01% by weight, the yield of the cuprous oxide ultrafine particles obtained in one reaction is low, and if it exceeds 50% by weight, the reaction of the copper carboxyl compound and the hydrazine and/or hydrazine derivative sometimes becomes non-uniform.

The optimum reaction temperature in the method (i) varies depending on combination of the copper carboxyl compound with the hydrazine and/or hydrazine derivative and selection of the reaction solution, but is preferably lower than 85° C. but not lower than 5° C. If the reaction temperature is lower than 5° C., the solubility of the copper carboxyl compound decreases and the copper carboxyl compound is sometimes precipitated, and if it is 85° C. or higher, the particle diameter of the resulting cuprous oxide tends to increase. For example, when copper acetate is used as the copper carboxyl compound and hydrated hydrazine is used as a reducing agent, the most preferred temperature range is 15-35° C.

In the case of the soft agglomerate of cuprous oxide ultrafine particles obtained in the present invention, cuprous oxide ultrafine particles weakly bond to each other to form a soft agglomerate, which is obtained as a sediment at the bottom of the reaction vessel after completion of the reducing reaction.

Next, the method (ii) for producing the soft agglomerate of cuprous oxide ultrafine particles is characterized in that in producing cuprous oxide ultrafine particles by heating and reducing at least one copper compound selected from the group consisting of a copper carboxyl compound, a copper alkoxy compound and a copper diketonate compound at a temperature of not lower than 160° C. in diethylene glycol, a colloidal dispersion of cuprous oxide ultrafine particles which is obtained in the course of the above production of the cuprous oxide ultrafine particles is further heated to softly agglomerate the cuprous oxide ultrafine particles.

The copper starting material used in this method is at least one copper compound selected from the group consisting of a copper carboxyl compound, a copper alkoxy compound and a copper diketonate compound.

As mentioned above, the copper carboxyl compound is obtained by reacting a copper salt with a carboxyl group-containing compound. As the copper salt used for the reaction of the copper salt with the carboxyl group-containing compound, mention may be made of copper hydroxide, copper nitrate, copper carbonate, and the like. The carboxyl group-containing compound includes, for example, a compound containing a carboxylic acid or a salt thereof in the molecule, such as a saturated carboxylic acid, an unsaturated carboxylic acid or a salt thereof. Examples thereof are formic acid, acetic acid, propionic acid, butylacetic acid, etc. Of the copper carboxyl compounds, copper acetate is most preferred.

The copper alkoxy compound is a copper compound having an alkoxy group. The alkoxy group is a monovalent atomic group in the form of alkyl group being bonded to oxygen, and examples thereof are methoxy group, ethoxy group, propoxy group, butoxy group, pentyloxy group, hexyloxy group, etc. Examples of the copper alkoxy compounds include copper methoxide, copper ethoxide, etc.

The copper diketonate compound is a copper compound having a diketone chelate. Among the diketone chelate compounds, β-diketone chelate compounds form a stable copper compound and hence are most preferred in the present invention. Examples of the β-diketone chelate compounds include acetylacetone, benzoylacetone, benzoyltrifluoroacetone, dibenzoylmethane, furoylacetone, trifluoroacetylacetone, etc. Examples of the diketonate compounds include copper acetylacetonate, copper-bis(2,2,6,6-tetramethyl-3,5-heptanedionate), etc.

In the method (ii), a colloidal dispersion of cuprous oxide ultrafine particles is obtained by heating the copper compound at a temperature of not lower than 160° C. in diethylene glycol, and thereafter the colloidal dispersion is further heated to obtain a soft agglomerate of cuprous oxide ultrafine particles. Because the colloidal dispersion of cuprous oxide ultrafine particles has yellow color, production of the colloidal dispersion can be easily noticed. This method is characterized in that after the yellow colloidal dispersion is obtained, this colloidal dispersion is successively heated. The heating temperature for obtaining the yellow colloidal dispersion is preferably not lower than 160° C. and lower than 200° C. At a temperature lower than 160° C., the reaction takes too much time, which is not preferred, and at a temperature of 200° C. or higher, the reaction is rapid and a hard agglomerate is sometimes obtained, which is not preferred.

When the yellow colloidal dispersion obtained is further heated to obtain the soft agglomerate, the heating temperature is preferably not lower than 30° C., more preferably not lower than 100° C. Without changing the temperature from heating of the copper compound until the yellow colloidal dispersion is obtained, the heating may be continued at that temperature. If the reaction heating temperature for the formation of the colloid of cuprous oxide ultrafine particles and for the formation of the soft agglomerate exceeds 200° C., a hard agglomerate which cannot be redispersed may sometimes be produced, and hence the preferred upper limit of the reaction heating temperature is 200° C.

By heating the colloidal dispersion of cuprous oxide ultrafine particles obtained in the course of the reaction, the probability of impingement of the cuprous oxide ultrafine particles dispersed in the reaction solution increases, and the cuprous oxide ultrafine particles begin to agglomerate because of this impingement between the ultrafine particles resulting in an increase of the size of the soft agglomerates over a period of time, finally forming reddish brown precipitates. The secondary particle diameter of the soft agglomerate of cuprous oxide ultrafine particles in the reaction solution can be monitored in the course of the reaction by optionally taking out a small amount of the reaction solution and measuring the average particle diameter. The reaction may be stopped when the average secondary particle diameter has reached a given size or when the yellow color of the cuprous oxide colloid has no longer been observed in the supernatant liquid of the reaction solution. This point of time may be taken as an end point of the reaction.

The time from beginning of heating of the reaction solution till formation of the yellow cuprous oxide colloidal dispersion and the time from formation of the yellow cuprous oxide colloidal dispersion till formation of the precipitates of soft agglomerates vary depending on the amount and kind of the copper compound charged in the reaction solution or the heating temperature. For example, when formation of the colloid and formation of the soft agglomerate are carried out at 180° C., typically, the time from beginning of heating of the reaction solution till formation of the yellow cuprous oxide colloidal dispersion is 1-5 hours, and the time from formation of the yellow cuprous oxide colloidal dispersion till formation of the precipitates of soft agglomerates is from 10 minutes to 1 hour.

Next, the method (iii) for producing a soft agglomerate of cuprous oxide ultrafine particles is characterized in that at least one copper compound selected from the group consisting of a copper carboxyl compound, a copper alkoxy compound and copper diketonate compound is heated and reduced at a temperature of not lower than 160° C. in diethylene glycol to obtain a colloidal dispersion of cuprous oxide ultrafine particles and thereafter an agglomerating agent for cuprous oxide ultrafine particles is added to the resulting dispersion. The copper compounds usable in this method are the same as used in the method (ii). Furthermore, the reaction temperature for obtaining the colloidal dispersion of cuprous oxide ultrafine particles is preferably not lower than 160° C. and lower than 200° C. At a temperature lower than 160° C., the reaction takes too much time, which is not preferred, and at a temperature of 200° C. or higher, the reaction is rapid and a hard agglomerate is sometimes obtained, which is not preferred.

The agglomerating agents for the cuprous oxide ultrafine particles are not particularly limited so long as they can softly agglomerate the cuprous oxide ultrafine particles, and they may be either inorganic compounds or organic compounds. As the inorganic compounds, there may be used water, inorganic salt compounds, and the like. Examples of the inorganic salt compounds include sodium chloride, potassium chloride, and the like. The agglomerating agents are preferably those which can be dissolved in diethylene glycol of a reaction solvent, and especially preferred is at least one compound selected from the group consisting of monoalcohol compounds, ether compounds, ester compounds, nitrile compounds, ketone compounds, amide compounds, imide compounds and sulfur compounds. The compounds which are liquid at room temperature are more preferred, and examples thereof are methanol, ethanol, propanol, diethyl ether, diethylene glycol diethyl ether, ethyl acetate, ethyl formate, acetonitrile, propionitrile, acetone, methyl ethyl ketone, acetamide, N,N-dimethylformamide, 2-pyrrolidone, N-methylpyrrolidone, dimethyl sulfoxide, sulfolane, etc.

The amount of the agglomerating agent necessary for obtaining the soft agglomerate of cuprous oxide ultrafine particles in the present invention varies depending on the kind of the agglomerating agent. Therefore, the agglomerating agent may be added while monitoring the secondary particle diameter of the soft agglomerate obtained and addition of the agglomerating agent may be stopped when it reaches a given particle diameter. For example, in the case of using N-methylpyrrolidone as the agglomerating agent, a desired soft agglomerate of cuprous oxide ultrafine particles can be obtained by adding the agglomerating agent in a volume between the volume equal to that of the diethylene glycol solvent used for obtaining the cuprous oxide ultrafine particles and the volume several times that of the diethylene glycol solvent.

Next, the method (iv) for producing the soft agglomerate of cuprous oxide ultrafine particles is characterized in that in heating and reducing at least one copper compound selected from the group consisting of a copper carboxyl compound, a copper alkoxy compound and a copper diketonate compound at a temperature of not lower than 160° C. in diethylene glycol, an agglomerating agent for cuprous oxide ultrafine particles soluble in diethylene glycol at the reaction temperature is added to the diethylene glycol. The copper compounds usable in this production method are the same as those used in the method (ii).

The agglomerating agents used in this production method may be inorganic compounds or organic compounds, but when organic compounds are used, it is preferred that they do not completely volatilize at a temperature at which diethylene glycol is heated, and the preferred boiling point is 160° C. or higher. The inorganic compounds include, for example, inorganic salt compounds such as sodium chloride and potassium chloride. Among the agglomerating agents, especially preferred is at least one compound selected from the group consisting of monoalcohol compounds, ether compounds, ester compounds, nitrile compounds, ketone compounds, amide compounds, imide compounds and sulfur compounds. Examples thereof are octanol, dodecanol, diethylene glycol diethyl ether, diisobutyl ketone, acetonylacetone, 2-ethylbutyl acetate, 2-ethylhexyl acetate, γ-butyllactone, dimethyl sulfoxide, sulfolane, etc.

The amount of the agglomerating agent necessary for obtaining the soft agglomerate of cuprous oxide ultrafine particles in the present invention varies depending on the kind of the agglomerating agent. Therefore, it is necessary to determine optimum agglomerating agent while checking the secondary particle diameter of the finally obtained soft agglomerate. The amount is usually not less than 0.1% by weight and not more than 10% by weight, more preferably not less than 0.1% by weight and not more than 5% by weight based on the whole reaction solution.

The heating temperature of the reaction solution in this production method is preferably not lower than 160° C. and lower than 200° C. If the temperature is lower than 160° C., the reaction takes too much time, which is not preferred, and if it is 200° C. or higher, the reaction is rapid and a hard agglomerate is sometimes formed, which is not preferred.

In all of the production methods (ii)-(iv), water may be added to diethylene glycol which is a reaction medium. When water is added, the amount of water is 30 moles or less, preferably 0.1-25 moles based on 1 mole of the copper compound. By adding 30 moles or less of water based on 1 mole of the copper compound, formation of the colloid of cuprous oxide ultrafine particles from the copper compound and formation of the soft agglomerate can be performed in a relatively short time. If the amount of water is too great, the proportion of cupric oxide in the resulting product increases, which is not preferred. In order to effectively exhibit the effect of water, the amount of water is preferably not less than 0.1 mole based on 1 mole of the copper compound. In the case of adding water, it is preferred to add water to diethylene glycol before starting of heating.

In the production methods (ii)-(iv), the concentration of the copper compound in the reaction solution is preferably not less than 0.1% by weight and less than 50% by weight. If the concentration of the copper compound is less than 0.1% by weight, yield of the cuprous oxide ultrafine particles obtained in one reaction is too low, which is not preferred, and if it is 50% by weight or more, solubility of the copper compound in diethylene glycol is insufficient, which is not preferred.

The precipitate of soft agglomerate of cuprous oxide ultrafine particles obtained in the methods (i)-(iv) usually forms a higher order structure by further weak bonding of the individual soft agglomerates.

Next, the method for producing a dispersion of copper oxide ultrafine particles will be explained. The soft agglomerate of copper oxide ultrafine particles of the present invention can be easily redispersed in a dispersion medium, and a uniform dispersion reduced in secondary particle diameter can be produced.

The method for producing a dispersion of copper oxide ultrafine particles according to the present invention includes a first step of obtaining a soft agglomerate of copper oxide ultrafine particles having an average primary particle diameter of not more than 100 nm and an average secondary particle diameter of not less than 0.2 μm in a first solvent, a second step of separating the soft agglomerate obtained at the first step from the first solvent, and a third step of redispersing the soft agglomerate separated at the second step in a second solvent to obtain a copper oxide dispersion.

The first step is a step where copper oxide ultrafine particles having a primary particle diameter of not more than 100 nm is synthesized in a first solvent and a precipitate of secondary particles which are weakly agglomerated each other is obtained. This is, for example, a step of obtaining a precipitate of soft agglomerate of cuprous oxide ultrafine particles in the bottom portion of the reaction solution by the above-mentioned method of producing soft agglomerate of cuprous oxide ultrafine particles.

The next second step is a step of separating the precipitate of the soft agglomerate obtained at the first step from the first solvent. In this method, the copper oxide ultrafine particles are softly agglomerated in the first step, and the soft agglomerate has such a large secondary particle diameter as causing precipitation, and hence separation from the first solvent which is a reaction solution can be easily performed. Specifically, the separation methods include, for example, a method of removing the supernatant liquid by decantation, a method of suction filtration, etc. The separated precipitate may have impurities such as reaction by-products deposited on the surface, and hence is preferably washed with a clean solvent.

The next third step is a step of redispersing the soft agglomerate separated at the second step in a second solvent to obtain a dispersion of copper oxide ultrafine particles. At this step, the second solvent, the resulting soft agglomerate and, if necessary, other additives are charged in a suitable container and then the redispersion treatment may be carried out. The redispersion treatment may be carried out, for example, by physical methods of applying physical energy, such as ultrasonic treatment and high-speed jet mill or chemical methods such as that of adding an acid or base to the system to adjust pH of the dispersion. The dispersion may be carried out by combining a plurality of these dispersion methods. The state of copper oxide ultrafine particles being redispersed is preferably a state where the copper oxide ultrafine particles reduced in secondary particle diameter are uniformly distributed in the dispersion medium, and the particles may be present in the suspended state in the form of colloid or in the state of a gel of the dispersion medium and the copper oxide ultrafine particles which is formed by the interaction.

The dispersing time required for obtaining the copper oxide dispersion depends on the dispersing method, and, for example, when ultrasonic method is employed, it is about 5 minutes. The copper oxide ultrafine particles are sometimes oxidized with oxygen, and the dispersion treatment is preferably carried out in an inert atmosphere such as nitrogen atmosphere.

The soft agglomerate of copper oxide ultrafine particles obtained at the second step is extremely small in primary particle diameter and can be reduced in secondary particle diameter by redispersion treatment. Therefore, a colloidal dispersion in which the copper oxide ultrafine particles are suspended in the state of a colloid can be produced by selecting properly the dispersion medium or the like. In order to obtain a stable colloidal dispersion free from sedimentation of copper oxide ultrafine particles, the average secondary particle diameter of the copper oxide ultrafine particles in the colloidal dispersion is preferably less than 200 nm, more preferably less than 100 nm, further preferably less than 50 nm.

The second solvent used at the third step may be the same as or different from the first solvent. The solid content of the copper oxide ultrafine particles based on the whole dispersion can be optionally adjusted depending on its use, and the solid content is ordinarily adjusted to 0.1-80% by weight. In the case of using the resulting colloidal dispersion for formation of copper wiring, etc., the higher solid content in the coat is preferred, and the weight of the copper oxide ultrafine particles is preferably 10% by weight or more, further preferably 30% by weight or more based on the whole dispersion.

In the redispersion treatment of secondary particles comprising weakly agglomerated copper oxide ultrafine particles at the third step, it is preferred that the particle diameter is reduced to such an extent that all precipitates are able to be dispersed and suspended in the dispersion medium. However, in case a part of the secondary particles precipitate even after the redispersion treatment, the precipitate can be separated and removed by decantation, centrifugation or the like. Furthermore, in order to reduce the average particle diameter of the colloidal dispersion of copper oxide ultrafine particles in the dispersion medium, the large particles may be precipitated and removed by centrifugation or the like.

At the third step, there may be added to the second solvent a dispersion agent for stably dispersing the copper oxide ultrafine particles in the second solvent. The dispersion agents include, for example, low-molecular compounds, oligomers and polymers having polar groups such as a hydroxyl group, an amino group and a carboxyl group. Examples of the low-molecular compounds having polar groups are alcohol compounds, amine compounds, amide compounds, ammonium compounds, phosphorus compounds, etc. Commercially available surfactants may also be used. The surfactants include, for example, cationic surfactants, anionic surfactants, non-polar surfactants, etc. Examples of the polymers having polar groups are polyvinylpyrrolidone, polyvinyl alcohol, polymethylvinyl ether, etc. Furthermore, as the dispersion agents, there may also be used inorganic or organic particles having polar groups on the surface. For example, there may be used silica particles or latex particles, on the surface of which simple metal fine particles or metal compound fine particles are supported and dispersed. Of course, a liquid dispersion agent can be used as the second solvent.

Of the above dispersion assistants, polyhydric alcohols are especially preferred. The polyhydric alcohols are organic compounds having two or more hydroxyl groups in the molecule. Among them, those which have ten or fewer carbon atoms are preferred. Examples of these compounds are ethylene glycol, diethylene glycol, 1,2-propanediol, 1,3-propanediol, 1,2-butanediol, 1,3-butanediol, 1,4-butanediol, 2,3-butanediol, pentanediol, hexanediol, octanediol, glycerol, etc. These polyhydric alcohols may be used each alone or in admixture of two or more.

In order to further diminish the impurities in the dispersion of copper oxide ultrafine particles which is obtained at the third step, there may be repeatedly carried out a washing step which comprises again agglomerating and precipitating the copper oxide ultrafine particles in the dispersion by the above-mentioned method, separating the precipitate from the third solvent, and then again dispersing the precipitate in the clean third solvent or in another clean dispersion medium in which the precipitate can be redispersed for obtaining a colloidal dispersion.

Additives such as a viscosity modifier, a reducing agent and a firing agent may be added to the dispersion at the third step, and furthermore a part of the second solvent may be removed by concentration or the like for adjusting the viscosity. The addition of the reducing agent to the dispersion has the effect of supressing oxidation of the copper oxide ultrafine particles. Furthermore, when the resulting dispersion is heated to convert copper oxide to metallic copper and this dispersion is used for the uses such as electrically conductive ink, there is exhibited an effect of lowering the heating temperature needed for reduction, which is particularly preferred.

The reducing agents used include, for example, aldehydes, sugar alcohols, sugars, hydrazine and derivatives thereof, diimides, oxalic acid, etc. Examples of the aldehydes are aliphatic saturated aldehydes such as formaldehyde, acetaldehyde, propionaldehyde, butylaldehyde, isobutylaldehyde, varelaldehyde, isovarelaldehyde, pivalic aldehyde, caproic aldehyde, heptaldehyde, caprylaldehyde, pelargonic aldehyde, undecylaldehyde, lauric aldehyde, tridecylaldehyde, myristinaldehyde, pentadecylaldehyde, palmitic aldehyde, margaric aldehyde and stearic aldehyde; aliphatic dialdehydes such as glyoxal and succindialdehyde; aliphatic unsaturated aldehydes such as acrolein, crotonaldehyde and propiolaldehyde; aromatic aldehydes such as benzaldehyde, o-tolualdehyde, m-tolualdehyde, p-tolualdehyde, salicylaldehyde, cinnamaldehyde, α-naphthoaldehyde and β-naphthoaldehyde; heterocyclic aldehydes such as furfural; and the like.

The diimides can be obtained, for example, by heat decomposition of an azodicarboxylic acid salt, hydroxylamine-O-sulfonic acid, N-allenesulfonylhydrazide or N-acylsulfonylhydrazide. The N-allenesulfonylhydrazide or N-acylsulfonylhydrazide includes, for example, p-toluenesulfonylhydrazide, benzenesulfonylhydrazide, 2,4,6-trisisopropylbenzenesulfonylhydrazide, chloroacetylhydrazide, o-nitrobenzenesulfonylhydrazide, m-nitrobenzenesulfonylhydrazide, p-nitrobenzenesulfonylhydrazide, etc.

The sugar alcohols include, for example, glycerol, erythritol, pentaerythritol, pentitol, pentose, hexitol, hexose, heptose, etc. The sugars include, for example, sorbitol, mannitol, xylitol, threitol, maltitol, arabitol, lactitol, adonitol, cellobiose, glucose, fructose, sucrose, lactose, mannose, galactose, erythrose, xylulose, allose, ribose, sorbose, xylose, arabinose, isomaltose, dextrose, glucoheptose, etc.

The hydrazine and derivatives thereof include, for example, alkylhydrazines such as monomethylhydrazine, dimethylhydrazine and β-hydroxyethylhydrazine, and hydrazine salts such as hydrazine sulfate, neutral hydrazine sulfate and hydrazine carbonate, and the like, in addition to hydrazine and hydrates thereof.

The content of the reducing agent is preferably 0.01-50% by mass, more preferably 0.01-30% by mass based on the total weight of the dispersion.

The firing agents usable in the third step are additives for forming copper thin films higher in denseness and better in quality by firing the dispersion of the copper oxide ultrafine particles obtained in the third step, and examples of the firing agents are polyether compounds. The polyether compounds are compounds having an ether linkage in the backbone, and it is preferred to uniformly disperse them in the dispersion medium. From the point of dispersibility in the dispersion medium, non-crystalline polyether compounds are preferred, and particularly preferred are aliphatic polyethers in which repeating units are straight chain and cyclic oxyalkylene groups of 1-8 carbon atoms. The molecular structure of the aliphatic polyether in which repeating units are straight chain and cyclic alkylene groups of 1-8 carbon atoms may be cyclic, straight chain or branched, and may be binary or higher polyether copolymers or straight chain or branched chain binary or higher polyether block polymers. Examples of them are polyether homopolymers such as polyethylene glycol, polypropylene glycol and polybutylene glycol, and, furthermore, binary copolymers such as ethylene glycol/propylene glycol and ethylene glycol/butylene glycol, and straight chain ternary copolymers such as ethylene glycol/propylene glycol/ethylene glycol, propylene glycol/ethylene glycol/propylene glycol and ethylene glycol/butylene glycol/ethylene glycol, to which the polyether compounds are not limited. Examples of the block copolymers are polyether block copolymers, e.g., binary block copolymers such as polyethylene glycol polypropylene glycol and polyethylene glycol polybutylene glycol, and straight chain ternary block copolymers such as polyethylene glycol polypropylene glycol polyethylene glycol, polypropylene glycol polyethylene glycol polypropylene glycol and polyethylene glycol polybutylene glycol polyethylene glycol. The terminals of these compounds may be modified with substituents such as alkyl group.

The copper oxide fine particles or dispersions of the copper oxide ultrafine particles obtained by the above-mentioned methods are extremely small in particle diameter of copper oxide and relatively easily reduced to metallic copper, and hence they are preferably usable for the uses such as copper wiring forming materials, copper bonding materials and substitutes for copper plating. Specifically, they are preferably used for the applications such as wiring materials for printing wiring boards and via holes filling materials, parts bonding materials for printing wiring boards, electrode materials of flat panel displays and electromagnetic shielding materials for resin articles and the like. Since the particle diameter of the copper oxide is very small, there is the characteristic that fine wiring can be formed. These dispersions of copper oxide ultrafine particles can be coated on desired substrates by coating methods such as the screen printing method, the dispensing method, the ink jet method and the spray method, and particularly the copper oxide colloidal dispersion low in viscosity can be ink jet coated and can be especially suitable as inks for ink jet printing. Furthermore, the copper oxide colloidal dispersion can also be used as ink for so-called soft lithography such as micro-contact printing for formation of fine wirings using a stamp subjected to fine processing and micro-molding.

As other uses of the copper oxide fine particles or dispersions of the copper oxide ultrafine particles obtained by the above-mentioned production methods, mention may be made of antifungal uses such as wood preservatives and ship bottom paints, and photoelectric energy conversion materials.

The present invention will be explained more specifically by the following examples, which should not be construed as limiting the invention in any manner. Explanation will be given based on cuprous oxide, but the present invention is not limited to cuprous oxide ultrafine particles.

The average secondary particle diameter of the soft agglomerate of cuprous oxide ultrafine particles is obtained in the following manner. The resulting precipitate is placed on a glass slide and five particles are optionally selected in the visual field of a light microscope. The average value of particle diameters of the particles is taken as the average secondary particle diameter.

The average primary particle diameter of the cuprous oxide ultrafine particles is measured by observing the surface using a transmission electron microscope (JEM-4000FX) manufactured by JEOL Ltd. In the surface observation by the electron microscope, three portions where the particles are relatively even in primary particle diameter are selected in the visual field and photographed at a magnification which is most suitable for measurement of particle diameter of the object to be measured. Three particles which are considered to be present in large number are selected from each photograph, and the diameter thereof is measured by a scale and the primary particle diameter is calculated. The average value thereof is taken as the average primary particle diameter.

That the resulting particles are cuprous oxide is confirmed in the following manner. Using an X-ray diffraction device (RINT 2500) manufactured by Rigaku Co., Ltd., intense diffraction peaks originating in planes (111) and (200) are observed at 36.5° and 42.4°, respectively, and when they coincide with XRD pattern of cuprous oxide, the particles are confirmed to be cuprous oxide.

The redispersibility of the soft agglomerate of cuprous oxide ultrafine particles in the dispersion medium is evaluated by carrying out a dispersion treatment at an output of 30 W for 2 minutes using an ultrasonic dispersing machine Vibracell™ 130 W model manufactured by Sonics & Materials Inc. The average secondary particle diameter of cuprous oxide in the colloidal dispersion obtained by the ultrasonic treatment is measured using a concentrated particle size distribution meter (FPAR 1000) manufactured by Otsuka Electronics Co., Ltd.

EXAMPLE 1

Dependence on Molar Ratio of Copper Carboxyl Compound/Hydrazine Compound—(1):

70 ml of purified water was added to 8 g of anhydrous copper acetate (manufactured by Wako Pure Chemical Industries, Ltd.). Thereto was added 2.6 ml of 64 wt % hydrazine hydrate while stirring at 25° C. so as to give a molar ratio of hydrazine to copper acetate of 1.2, thereby to carry out the reaction to obtain a precipitate of cuprous oxide. The average primary particle diameter of the precipitate was 20 nm and the average secondary particle diameter was 800 μm. One gram of the precipitate was added to 9 g of diethylene glycol, followed by subjecting to ultrasonic dispersion to obtain a colloidal dispersion of cuprous oxide. The average secondary particle diameter in the dispersion was 80 nm.

EXAMPLE 2

Dependence on Molar Ratio of Copper Carboxyl Compound/Hydrazine Compound—(2):

70 ml of purified water was added to 8 g of anhydrous copper acetate (manufactured by Wako Pure Chemical Industries, Ltd.). Thereto was added 1.32 ml of 64 wt % hydrazine hydrate while stirring at 25° C. so as to give a molar ratio of hydrazine to copper acetate of 0.6, thereby to carry out the reaction to obtain a precipitate of cuprous oxide. The average primary particle diameter and the average secondary particle diameter were 30 nm and 300 μm, respectively. The average secondary particle diameter in the colloidal dispersion, obtained in the same manner as in Example 1, was 80 nm.

EXAMPLE 3

Dependence on Molar Ratio of Copper Carboxyl Compound/Hydrazine Compound—(3):

70 ml of purified water was added to 8 g of anhydrous copper acetate (manufactured by Wako Pure Chemical Industries, Ltd.). Thereto was added 6.5 ml of 64 wt % hydrazine hydrate while stirring at 25° C. so as to give a molar ratio of hydrazine to copper acetate of 3.0, thereby to carry out the reaction to obtain a precipitate of cuprous oxide. The average primary particle diameter and the average secondary particle diameter were 60 nm and 200 μm, respectively. The average secondary particle diameter in the colloidal dispersion, obtained in the same manner as in Example 1, was 120 nm.

EXAMPLE 4

Dependence on Molar Ratio of Copper Carboxyl Compound/Hydrazine Compound—(4):

70 ml of purified water was added to 8 g of anhydrous copper acetate (manufactured by Wako Pure Chemical Industries, Ltd.). Thereto was added 2 ml of 64 wt % hydrazine hydrate while stirring at 60° C. so as to give a molar ratio of hydrazine to copper acetate of 0.9, thereby carrying out the reaction to obtain a precipitate of cuprous oxide. The average primary particle diameter and the average secondary particle diameter were 50 nm and 180 μm, respectively. The average secondary particle diameter in the colloidal dispersion, obtained in the same manner as in Example 1, was 95 nm.

EXAMPLE 5

Example of an Alcohol Compound in the Reaction Solution—(1):

50 ml of purified water and 20 ml of ethylene glycol were added to 8 g of anhydrous copper acetate (manufactured by Wako Pure Chemical Industries, Ltd.). Thereto was added 2.0 ml of 64 wt % hydrazine hydrate while stirring at room temperature of 25° C. so as to give a molar ratio of hydrazine to copper acetate of 0.9, thereby to carry out the reaction to obtain a precipitate of cuprous oxide. The average primary particle diameter and the average secondary particle diameter were 10 nm and 350 μm, respectively. The average secondary particle diameter in the colloidal dispersion, obtained in the same manner as in Example 1, was 45 nm.

EXAMPLE 6

Example of an Alcohol Compound in the Reaction Solution—(2):

40 ml of purified water and 30 ml of ethanol were added to 8 g of anhydrous copper acetate (manufactured by Wako Pure Chemical Industries, Ltd.). Thereto was added 2.4 ml of 64 wt % hydrazine hydrate while stirring at room temperature of 25° C. so as to give a molar ratio of hydrazine to copper acetate of 1.1, thereby carrying out the reaction to obtain a precipitate of cuprous oxide. The average primary particle diameter and the average secondary particle diameter were 10 nm and 190 μm, respectively. The average secondary particle diameter in the colloidal dispersion, obtained in the same manner as in Example 1, was 40 nm.

EXAMPLE 7

Example of Obtaining a Copper Carboxyl Compound from Copper Hydroxide and Acetic Anhydride:

To 60 ml of purified water were added 1.95 g of copper hydroxide (manufactured by Wako Pure Chemical Industries, Ltd.) and 3 ml of acetic anhydride. Thereto was further added 1.6 ml of 64 wt % hydrazine hydrate, followed by stirring at 25° C. to obtain a precipitate of cuprous oxide. The average primary particle diameter and the average secondary particle diameter were 60 nm and 300 μm, respectively. The average secondary particle diameter in the colloidal dispersion, obtained in the same manner as in Example 1, was 100 nm.

EXAMPLE 8

Example of Adding a Basic Compound at the Time of Reaction—(1):

In 600 ml of purified water was dissolved 32 g (0.2 mol) of anhydrous copper sulfate (manufactured by Wako Pure Chemical Industries, Ltd.), and 20 ml of acetic anhydride (manufactured by Wako Pure Chemical Industries, Ltd.) was added to the solution at 30° C. while stirring. After a lapse of several minutes, thereto were added 300 ml of a 1 M aqueous sodium hydroxide solution (manufactured by Wako Pure Chemical Industries, Ltd.) and 15 ml of hydrazine hydrate (manufactured by Wako Pure Chemical Industries, Ltd.) while stirring to carry out the reaction to obtain a precipitate of cuprous oxide. The average primary particle diameter and the average secondary particle diameter were 15 nm and 220

μm, respectively. The average secondary particle diameter in the colloidal dispersion, obtained in the same manner as in Example 1, was 50 nm.

EXAMPLE 9

Example of Adding a Basic Compound at the Time of Reaction—(2):

In 600 ml of purified water was dissolved 19.5 g (0.2 mol) of copper hydroxide (manufactured by Wako Pure Chemical Industries, Ltd.), and 20 ml of acetic anhydride (manufactured by Wako Pure Chemical Industries, Ltd.) was added to the solution at 30° C. while stirring. After a lapse of several minutes, thereto were added 30 ml of a 1 M aqueous sodium hydroxide solution (manufactured by Wako Pure Chemical Industries, Ltd.) and 12 ml of hydrazine hydrate (manufactured by Wako Pure Chemical Industries, Ltd.) while stirring to carry out the reaction to obtain a precipitate of cuprous oxide. The average primary particle diameter and the average secondary particle diameter were 20 nm and 130 μm, respectively. The average secondary particle diameter in the colloidal dispersion, obtained in the same manner as in Example 1, was 55 nm.

EXAMPLE 10

Example of Adding a Basic Compound at the Time of Reaction—(3):

In 600 ml of purified water was dissolved 47.3 g (0.2 mol) of copper nitrate (manufactured by Wako Pure Chemical Industries, Ltd.), and 20 ml of acetic anhydride (manufactured by Wako Pure Chemical Industries, Ltd.) was added to the solution at 30° C. while stirring. After a lapse of several minutes, thereto were added 300 ml of a 1 M aqueous sodium hydroxide solution (manufactured by Wako Pure Chemical Industries, Ltd.) and 15 ml of hydrazine hydrate (manufactured by Wako Pure Chemical Industries, Ltd.) while stirring to carry out the reaction to obtain a precipitate of cuprous oxide. The average primary particle diameter and the average secondary particle diameter were 15 nm and 180 μm, respectively. The average secondary particle diameter in the colloidal dispersion, obtained in the same manner as in Example 1, was 45 nm.

EXAMPLE 11

Example of Adding a Basic Compound at the Time of Reaction—(4):

In 600 ml of purified water was dissolved 47.3 g (0.2 mol) of copper nitrate (manufactured by Wako Pure Chemical Industries, Ltd.), and 20 ml of propionic acid (manufactured by Wako Pure Chemical Industries, Ltd.) was added to the solution at 30° C. while stirring. After a lapse of several minutes, thereto were added 10 ml of a 1 M aqueous sodium hydroxide solution (manufactured by Wako Pure Chemical Industries, Ltd.) and 7.5 ml of hydrazine hydrate (manufactured by Wako Pure Chemical Industries, Ltd.) while stirring to carry out the reaction to obtain a precipitate of cuprous oxide. The average primary particle diameter and the average secondary particle diameter were 20 nm and 250 μm, respectively. The average secondary particle diameter in the colloidal dispersion, obtained in the same manner as in Example 1, was 50 nm.

EXAMPLE 12

Example of Adding a Basic Compound at the Time of Reaction—(5):

In 600 ml of purified water was dissolved 47.3 g (0.2 mol) of copper nitrate (manufactured by Wako Pure Chemical Industries, Ltd.), and 8.2 g of sodium acetate (manufactured by Wako Pure Chemical Industries, Ltd.) was added to the solution at 30° C. while stirring. After a lapse of several minutes, thereto were added 40 ml of a 1 M aqueous sodium hydroxide solution (manufactured by Wako Pure Chemical Industries, Ltd.) and 7.5 ml of hydrazine hydrate (manufactured by Wako Pure Chemical Industries, Ltd.) while stirring to carry out the reaction to obtain a precipitate of cuprous oxide. The average primary particle diameter and the average secondary particle diameter were 20 nm and 240 μm, respectively. The average secondary particle diameter in the colloidal dispersion, obtained in the same manner as in Example 1, was 60 nm.

EXAMPLE 13

Example of Using a Hydrazine Derivative as a Reducing Agent:

In a 300 ml beaker were charged 3.6 g of anhydrous copper acetate and 30 ml of purified water, followed by stirring for 20 minutes. The reaction solution temperature was set at 30° C., and 2 ml of β-hydroxyethylhydrazine (manufactured by Japan Hydrazine Company, Inc.) was added while stirring to carry out the reaction for 20 minutes to obtain a precipitate of cuprous oxide. The average primary particle diameter and the average secondary particle diameter were 30 nm and 200 μm, respectively. The average secondary particle diameter in the colloidal dispersion, obtained in the same manner as in Example 1, was 85 nm.

EXAMPLE 14

Example of Using Diluted Hydrazine as a Reducing Agent—(1):

70 ml of purified water was added to 8 g of anhydrous copper acetate (manufactured by Wako Pure Chemical Industries, Ltd.). Thereto was added 3.9 ml of a 40 wt % aqueous hydrazine solution (prepared by diluting hydrazine hydrate) at 25° C. while stirring so as to give a molar ratio of hydrazine to copper acetate of 1.1, thereby to carry out the reaction to obtain a precipitate of cuprous oxide. The average primary particle diameter and the average secondary particle diameter were 22 nm and 150 μm, respectively. The average secondary particle diameter in the colloidal dispersion, obtained in the same manner as in Example 1, was 80 nm.

EXAMPLE 15

Example of Using Diluted Hydrazine as a Reducing Agent—(2):

70 ml of purified water was added to 8 g of anhydrous copper acetate (manufactured by Wako Pure Chemical Industries, Ltd.). Thereto was added 7.8 ml of a 20 wt % aqueous hydrazine solution (prepared by diluting hydrazine hydrate) at 25° C. while stirring so as to give a molar ratio of hydrazine and copper acetate of 1.1, thereby to carry out the reaction to obtain a precipitate of cuprous oxide. The average primary particle diameter and the average secondary particle diameter were 30 nm and 250 μm, respectively. The average secondary particle diameter in the colloidal dispersion, obtained in the same manner as in Example 1, was 90 nm.

EXAMPLE 16

Example of Using Diluted Hydrazine as a Reducing Agent—(3):

70 ml of purified water was added to 8 g of anhydrous copper acetate (manufactured by Wako Pure Chemical Industries, Ltd.). Thereto was added 31.2 ml of a 5 wt % aqueous hydrazine solution (prepared by diluting hydrazine hydrate) at 25° C. while stirring so as to give a molar ratio of hydrazine to copper acetate of 1.1, thereby to carry out the reaction to obtain a precipitate of cuprous oxide. The average primary particle diameter and the average secondary particle diameter were 40 nm and 200 μm, respectively. The average secondary particle diameter in the colloidal dispersion, obtained in the same manner as in Example 1, was 100 nm.

EXAMPLE 17

Example of Forming a Soft Agglomerate by Heating—(1):

2.7 g of copper acetate (manufactured by Wako Pure Chemical Industries, Ltd.) was suspended in 90 ml of diethylene glycol (manufactured by Wako Pure Chemical Industries, Ltd.), and 0.9 g of water was added to the suspension, followed by carrying out the heating reaction at 190° C. for 3 hours, thereby once obtaining a yellow cuprous oxide colloidal dispersion. Thereafter, the heating reaction was carried out for a further 30 minutes while maintaining the above temperature to obtain a precipitate of cuprous oxide. The average primary particle diameter and the average secondary particle diameter were 90 nm and 290 μm, respectively. The average secondary particle diameter in the colloidal dispersion, obtained in the same manner as in Example 1, was 150 nm.

EXAMPLE 18

Example of Forming a Soft Agglomerate by Heating—(2):

1.9 g of copper methoxide (manufactured by Wako Pure Chemical Industries, Ltd.) was suspended in 90 ml of diethylene glycol (manufactured by Wako Pure Chemical Industries, Ltd.), and 0.9 g of water was added to the suspension, followed by carrying out the reaction with heating at 190° C. for 1 hour, thereby obtaining a yellow cuprous oxide colloidal dispersion. Thereafter, the reaction with heating was carried out for further 20 minutes while maintaining the above temperature to obtain a precipitate of cuprous oxide. The average primary particle diameter and the average secondary particle diameter were 80 nm and 90 μm, respectively. The average secondary particle diameter in the colloidal dispersion obtained in the same manner as in Example 1 was 150 nm.

EXAMPLE 19

Example of Forming a Soft Agglomerate by Heating—(3):

4.0 g of copper acetylacetonate (manufactured by Wako Pure Chemical Industries, Ltd.) was suspended in 90 ml of diethylene glycol (manufactured by Wako Pure Chemical Industries, Ltd.), and 0.9 g of water was added to the suspension, followed by carrying out the reaction with heating at 190° C. for 3 hours, thereby obtaining a yellow cuprous oxide colloidal dispersion. Thereafter, the reaction with heating was carried out for a further 30 minutes while maintaining the above temperature to obtain a precipitate of cuprous oxide. The average primary particle diameter and the average secondary particle diameter were 80 nm and 100 μm, respectively. The average secondary particle diameter in the colloidal dispersion, obtained in the same manner as in Example 1, was 170 nm.

EXAMPLE 20

Example of Forming a Soft Agglomerate by Adding an Alcohol Compound:

2.7 g of copper acetate (manufactured by Wako Pure Chemical Industries, Ltd.) was suspended in 90 ml of diethylene glycol (manufactured by Wako Pure Chemical Industries, Ltd.), and 0.9 g of water was added to the suspension, followed by carrying out the reaction with heating at 190° C. for 3 hours, thereby obtaining a yellow cuprous oxide colloidal dispersion. Thereafter, to this dispersion was added 300 ml of ethanol to obtain a precipitate of cuprous oxide. The average primary particle diameter and the average secondary particle diameter were 90 nm and 150 μm, respectively. The average secondary particle diameter in the colloidal dispersion, obtained in the same manner as in Example 1, was 180 nm.

EXAMPLE 21

Example of Forming a Soft Agglomerate by Adding an Alcohol Compound to the Reaction Solvent:

2.7 g of copper acetate (manufactured by Wako Pure Chemical Industries, Ltd.) was suspended in 90 ml of diethylene glycol (manufactured by Wako Pure Chemical Industries, Ltd.), and 0.9 g of water and 0.5 g of octanol were added to the suspension, followed by carrying out the reaction with heating at 190° C. for 3 hours to obtain a precipitate of cuprous oxide. The average primary particle diameter and the average secondary particle diameter were 95 nm and 100 μm, respectively. The average secondary particle diameter in the colloidal dispersion, obtained in the same manner as in Example 1, was 180 nm.

EXAMPLE 22

Example of Producing a Copper Thin Film Using a Dispersion of Cuprous Oxide Ultrafine Particles—(1):

6.0 g of diethylene glycol and 3.0 g of polyethylene glycol (having an average molecular weight of 200; manufactured by Wako Pure Chemical Industries, Ltd.) as an additive were added to 3.1 g of a soft agglomerate of cuprous oxide ultrafine particles which was obtained in the same manner as in Example 1. The mixture was subjected to ultrasonic dispersion to prepare a colloidal dispersion of cuprous oxide ultrafine particles. This dispersion was coated in an area of 50 mm×100 mm on a square glass plate having sides of 120 mm by a bar coater to form a 50 μm thick coating. This coated glass plate was fired at 350° C. for 1 hour on a hot plate in a nitrogen gas stream to obtain a copper thin film on the glass plate. The resulting copper thin film had a thickness of 2.5 μm and a volume resistivity of $7 \times 10^{-6}$ Ωcm.

EXAMPLE 23

Example of Producing a Copper Wiring Using a Dispersion of Cuprous Oxide Ultrafine Particles—(2):

6.0 g of diethylene glycol and 1.0 g of polyethylene glycol (having an average molecular weight of 200; manufactured by Wako Pure Chemical Industries, Ltd.) as an additive were added to 1.0 g of a soft agglomerate of cuprous oxide ultrafine particles which was obtained in the same manner as in Example 1. The mixture was subjected to ultrasonic dispersion to prepare a colloidal dispersion of cuprous oxide ultrafine particles. The secondary particle diameter of the cuprous oxide ultrafine particles in the colloidal dispersion was 100 nm. This dispersion was filled into an ink cartridge of a print head of ink jet system and the cartridge was fitted in an exclusive-use printer. In this example, a piezo type print head was used as the ink jet system. The ink was jetted in an average liquid amount of 4 picoliters onto a slide glass to print a straight line pattern of 5 μm in thickness and 100 μm in line width. After printing, the glass substrate was subjected to a heat treatment at 350° C./1 hour in a nitrogen gas atmosphere to carry out reduction of cuprous oxide. The resulting metal wiring pattern had a good resistance of $5 \times 10^{-6}$ Ω·cm.

EXAMPLE 24

Example of a Dispersion of Cuprous Oxide Ultrafine Particles Which Contains a Reducing Agent:

6.0 g of ethylene glycol and 0.4 g of hydrazine carbonate as a reducing agent were added to 3.0 g of a soft agglomerate of cuprous oxide ultrafine particles which was obtained in the same manner as in Example 1, followed by subjecting to ultrasonic dispersion to prepare a dispersion of cuprous oxide ultrafine particles. This dispersion was bar coated on a glass substrate in the same manner as in Example 22, followed by heating in a nitrogen atmosphere to confirm that copper was produced at a low temperature of 200° C.

COMPARATIVE EXAMPLE 1

When the amount of hydrazine added was larger than the specified amount:

70 ml of purified water was added to 8 g of anhydrous copper acetate (manufactured by Wako Pure Chemical Industries, Ltd.). Thereto was added 12.0 ml of 64 wt % hydrazine hydrate at room temperature of 25° C. while stirring so as to give a molar ratio of hydrazine to copper acetate of 5.5, thereby to carry out the reaction to find that the resulting product contained about 20% by weight of metallic copper.

COMPARATIVE EXAMPLE 2

When the amount of hydrazine added was smaller than the specified amount:

70 ml of purified water was added to 8 g of anhydrous copper acetate (manufactured by Wako Pure Chemical Industries, Ltd.). Thereto was added 0.66 ml of 64 wt % hydrazine hydrate at room temperature of 25° C. while stirring so as to give a molar ratio of hydrazine to copper acetate of 0.3, thereby to carry out the reaction to obtain a precipitate of cuprous oxide. The average primary particle diameter of the resulting cuprous oxide was large, namely, 200 nm.

COMPARATIVE EXAMPLE 3

When a copper salt other than copper carboxyl compound was used as a starting material—(1):

10 ml of purified water was added to 0.22 g of copper chloride (manufactured by Wako Pure Chemical Industries, Ltd.). Thereto was added 50 μl of 64 wt % hydrazine hydrate at room temperature of 25° C. while stirring so as to give a molar ratio of hydrazine to copper chloride of 0.6, thereby carrying out the reaction. As a result, cuprous oxide ultrafine particles were not obtained, but copper was produced.

COMPARATIVE EXAMPLE 4

When a copper salt other than copper carboxyl compound was used as a starting material—(2):

10 ml of purified water was added to 0.26 g of copper sulfate (manufactured by Wako Pure Chemical Industries, Ltd.). Thereto was added 50 μl of 64 wt % hydrazine hydrate at room temperature of 25° C. while stirring so as to give a molar ratio of hydrazine to copper sulfate of 0.6, thereby to carry out the reaction. As a result, cuprous oxide ultrafine particles were not obtained, and the main component of the product was copper.

COMPARATIVE EXAMPLE 5

When a copper salt other than copper carboxyl compound was used as a starting material—(3):

10 ml of purified water was added to 0.16 g of copper hydroxide (manufactured by Wako Pure Chemical Industries, Ltd.). Thereto was added 75 μl of 64 wt % hydrazine hydrate at room temperature of 25° C. while stirring so as to give a molar ratio of hydrazine to copper sulfate of 0.9, thereby-carrying out the reaction. As a result, a precipitate of cuprous oxide was obtained, but the average primary particle diameter was large, namely, 300 nm.

COMPARATIVE EXAMPLE 6

When the reaction solution did not contain water:

70 ml of diethylene glycol was added to 8 g of anhydrous copper acetate (manufactured by Wako Pure Chemical Industries, Ltd.). Thereto was added 2.6 ml of 64 wt % hydrazine hydrate at room temperature of 25° C. while stirring so as to give a molar ratio of hydrazine and copper acetate of 1.2, thereby to carry out the reaction. As a result, the resulting precipitate was not cuprous oxide, but copper.

COMPARATIVE EXAMPLE 7

Example in which the step of soft agglomeration was not carried out:

In the same manner as in Example 20, 2.7 g of copper acetate (manufactured by Wako Pure Chemical Industries, Ltd.) was suspended in 90 ml of diethylene glycol (manufactured by Wako Pure Chemical Industries, Ltd.), and 0.9 g of water was added to the suspension, followed by carrying out the reaction with heating at 190° C. for 3 hours to obtain a yellow cuprous oxide colloidal dispersion. The cuprous oxide fine particles are suspended in the reaction solution, and a centrifuging step was needed to recover the suspended fine particles. For this centrifuging step, there was needed first an operation to divide the resulting colloidal dispersion in centrifuge tubes with making the weight even, and thereafter the centrifuge tubes were set in a rotor, and this rotor was centrifuged by a centrifugal separator. Thus, this step required much time.

The invention claimed is:

1. A method for producing a dispersion of cuprous oxide ultrafine particles which comprises a first step of synthesizing cuprous oxide ultrafine particles having an average primary particle diameter of not more than 100 nm in a first solvent and simultaneously therewith obtaining a soft agglomerate of cuprous oxide ultrafine particles having a secondary particle diameter of not less than 0.2 μm, a second step of separating the soft agglomerate obtained at the first step from the first solvent, and a third step of redispersing the soft agglomerate separated at the second step in a second solvent to obtain a dispersion of cuprous oxide ultrafine particles, wherein the dispersion of cuprous oxide ultrafine particles obtained at the third step is in the colloidal state and the cuprous oxide ultrafine particles are suspended in the dispersion.

2. A method for producing a dispersion of cuprous oxide ultrafine particles according to claim 1, wherein the cuprous oxide ultrafine particles have an average secondary particle diameter of less than 200 nm in the dispersion of cuprous oxide ultrafine particles which is in the colloidal state obtained in the third step.

3. A method for producing a dispersion of cuprous oxide ultrafine particles according to claim 1, wherein the second solvent contains a dispersing agent for the cuprous oxide ultrafine particles.

4. A method for producing a dispersion of cuprous oxide ultrafine particles according to claim 3, wherein the dispersing agent is a polyhydric alcohol.

5. A method for producing a dispersion of cuprous oxide ultrafine particles according to claim 4, wherein the polyhydric alcohol has a carbon number of not more than 10.

6. A method for producing cuprous oxide ultrafine particles having an average primary particle diameter of not more than 100 nm and an average secondary particle diameter of less than 0.2 μm, which comprises obtaining cuprous oxide ultrafine particles which are in the colloidal state by dispersing a soft agglomerate of cuprous oxide ultrafine particles.

7. A method for producing a soft agglomerate of cuprous oxide ultrafine particles having an average primary particle diameter of not more than 100 nm and an average secondary particle diameter of not less than 0.2 μm,
which comprises reducing a cuprous carboxyl compound of copper acetate with hydrazine and/or a hydrazine derivative in an amount of 0.4-5.0 moles based on 1 mole of the cuprous carboxyl compound in an aqueous solution containing not less than 10% by weight of water to produce cuprous oxide ultrafine particles, wherein the aqueous solution further comprises at least one organic compound selected from the group consisting of an alcohol compound, ether compound, ester compound and amide compound.

8. A method for producing a soft agglomerate of cuprous oxide ultrafine particles having an average primary particle diameter of not more than 100 nm and an average secondary particle diameter of not less than 0.2 μm, which comprises reducing a cuprous carboxyl compound with hydrazine and/or a hydrazine derivative in an amount of 0.4-5.0 moles based on 1 mole of the cuprous carboxyl compound in an aqueous solution containing not less than 10% by weight of water to produce cuprous oxide ultrafine particles, and further adding a basic compound for reducing the copper carboxyl compound with hydrazine and/or a hydrazine derivative.

9. A method for producing a soft agglomerate of cuprous oxide ultrafine particles according to claim 7 or 8, wherein hydrazine and/or a hydrazine derivative are dissolved in the solution at a concentration higher than 20% by weight and the solution is added to the reaction solution.

10. A method for producing a soft agglomerate of cuprous oxide ultrafine particles having an average primary particle diameter of not more than 100 nm and an average secondary particle diameter of not less than 0.2 μm, which comprises obtaining a colloidal dispersion of cuprous oxide ultrafine particles by heating and reducing at least one copper compound selected from the group consisting of a copper carboxyl compound, a copper alkoxy compound and copper diketonate compound at a temperature of not lower than 160° C. in diethylene glycol and forming a soft agglomerate of cuprous oxide ultrafine particles by further heating the colloidal dispersion.

11. A method for producing a soft agglomerate of cuprous oxide ultrafine particles according to claim 10, wherein diethylene glycol contains water in an amount of not more than 30 moles based on 1 mole of the copper compound.

12. A method for producing a soft agglomerate of cuprous oxide ultrafine particles having an average primary particle diameter of not more than 100 nm and an average secondary particle diameter of not less than 0.2 μm, which comprises obtaining a colloidal dispersion of cuprous oxide ultrafine particles by heating and reducing at least one copper compound selected from the group consisting of a copper carboxyl compound, a copper alkoxy compound and copper diketonate compound at a temperature of not lower than 160° C. in diethylene glycol and then adding to the dispersion an agglomerating agent for cuprous oxide ultrafine particles.

13. A method for producing a soft agglomerate of cuprous oxide ultrafine particles according to claim 12, wherein the agglomerating agent is at least one compound selected from the group consisting of a monoalcohol compound, ether compound, ester compound, nitrile compound, amide compound and imide compound.

14. A method for producing a soft agglomerate of cuprous oxide ultrafine particles having an average primary particle diameter of not more than 100 nm and an average secondary particle diameter of not less than 0.2 μm, which comprises heating and reducing at least one copper compound selected from the group consisting of a copper carboxyl compound, a copper alkoxy compound and copper diketonate compound at a temperature of not lower than 160° C. in diethylene glycol and simultaneously adding to the diethylene glycol an agglomerating agent for cuprous oxide ultrafine particles, which is soluble in diethylene glycol at the reaction temperature.

\* \* \* \* \*